United States Patent [19]
Mita et al.

[11] Patent Number: 6,166,562
[45] Date of Patent: Dec. 26, 2000

[54] SEMICONDUCTOR INTEGRATED CIRCUIT DEVICE

[75] Inventors: Shinji Mita; Kojiro Suzuki, both of Kawasaki; Tadahiro Kuroda, Yokohama, all of Japan

[73] Assignee: Kabushiki Kaisha Toshiba, Kanaqawa-ken, Japan

[21] Appl. No.: 09/030,737

[22] Filed: Feb. 25, 1998

[30] Foreign Application Priority Data

Feb. 26, 1997  [JP]  Japan ................................ 9-042196

[51] Int. Cl.$^7$ ............................................. H03K 19/0185
[52] U.S. Cl. ............................................. 326/83; 326/93
[58] Field of Search ................................. 326/83, 93, 37, 326/38, 46, 47, 86

[56] References Cited

U.S. PATENT DOCUMENTS

| | | | |
|---|---|---|---|
| 5,254,883 | 10/1993 | Horowitz et al. | 326/87 |
| 5,568,068 | 10/1996 | Ota et al. | 326/83 |
| 5,870,401 | 2/1999 | Riley | 327/143 |
| 6,005,422 | 12/1999 | Morinaka et al. | 327/141 |
| 6,047,346 | 4/2000 | Lau et al. | 327/158 |

*Primary Examiner*—Michael Tokar
*Assistant Examiner*—Don Phu Le
*Attorney, Agent, or Firm*—Hogan & Hartson, LLP

[57] ABSTRACT

A driving voltage supplied to a semiconductor integrated circuit can be controlled. The semiconductor integrated circuit device provided with a voltage converter circuit comprises: a buffer circuit having: a P-channel MOS transistor having a source connected to a first supply voltage; and an N-channel MOS transistor having a source connected to a second supply voltage and a drain connected to a drain of the P-channel MOS transistor, an output voltage being outputted from a common-connected drain terminals of the two MOS transistors; a duty ratio control circuit having: a counter for outputting a first n-bit signal by repeatedly counting up numbers from 0 to $(2^n-1)$ one by one in synchronism with a first clock signal; and a comparator circuit for comparing the first n-bit signal with a second n-bit signal applied from the outside, and for outputting a first control signal to a gate of the P-channel MOS transistor and a second control signal to the N-channel MOS transistor; and a smoothing circuit for smoothing the output of the buffer circuit, a voltage smoothed by the smoothing circuit being outputted as an output of the voltage converter circuit.

20 Claims, 13 Drawing Sheets

SEMICONDUCTOR INTEGRATED CIRCUIT DEVICE

BACKGROUND OF THE INVENTION

1. Field of the Invention

The present invention relates to a semiconductor integrated circuit device provided with a voltage converter circuit for supplying a driving voltage to an integrated circuit.

2. Description of the Prior Art

Recently, it has been proposed to reduce the driving voltage supplied to an integrated circuit, as far as the integrated circuit can operate normally, to decrease the power consumption of the integrated circuit.

FIG. 20 is a block diagram showing a prior art voltage converter circuit for converting a supply voltage supplied from the outside to a lower driving voltage of an integrated circuit, and FIG. 21 is a diagram showing the operating waveforms thereof at various points of the voltage converter.

A clock signal A as shown by (a) in FIG. 21 is applied to an input terminal of the voltage converter circuit shown in FIG. 20, and then inverted by an inverter 121. The inverted clock signal is given to one input terminal of a NAND circuit 123 and the other input terminal of the same NAND circuit 123 via a delay circuit 122. Therefore, two clock signals having a difference in delay time between the two are inputted to the same NAND circuit 123 as shown by (b) and (c) in FIG. 21, so that the duty ratio of an output X of the NAND circuit 123 changes according to the above-mentioned delay time as shown by (d) in FIG. 21. Further, the output X of the NAND circuit 123 is given to a buffer circuit composed of a P-channel MOS transistor M1 and an N-channel MOS transistor M2 for inversion. An output Y (pulse signal) of this buffer circuit as shown by (e) in FIG. 21 is further smoothed by a filter circuit composed of an inductor L1 and a capacitor C1, and then supplied to an integrated circuit as a driving voltage. Here, an output voltage Z (a straight line) of the filter circuit is a voltage obtained by averaging the output voltage Y of the buffer circuit, as shown by (e) in FIG. 21.

In the above-mentioned prior art voltage converter circuit, however, since the voltage supplied to the integrated circuit is a constant voltage decided according to the delay time of the delay circuit 122, that is, a constant voltage obtained in accordance with the circuit design of the voltage converter circuit, it is impossible to change the voltage supplied to the integrated circuit when the integrated circuit is operating. Therefore, there exists a problem in that an optimum driving voltage cannot be always supplied to the integrated circuit by use of the prior art voltage converter circuit.

SUMMARY OF THE INVENTION

With these problems in mind, therefore, it is the object of the present invention to provide a semiconductor integrated circuit device which can control the driving voltage applied to an integrated circuit.

To achieve the above-mentioned object, the present invention provides a semiconductor integrated circuit device provided with a voltage converter circuit which comprises: a buffer circuit including: a P-channel MOS transistor having a source connected to a first supply voltage; and an N-channel MOS transistor having a source connected to a second supply voltage and a drain connected to a drain of said P-channel MOS transistor, an output voltage of the buffer circuit being outputted from a common-connected drain terminals of said two MOS transistors; a duty ratio control circuit including: a counter for outputting a first n-bit signal by repeatedly counting up numbers from 0 to ($2^n-1$) one by one in synchronism with a first clock signal; and a comparator circuit for comparing the first n-bit signal with a second n-bit signal applied from the outside, and for outputting a first control signal to a gate of said P-channel MOS transistor and a second control signal to said N-channel MOS transistor; and a smoothing circuit for smoothing the output voltage of said buffer circuit, a voltage smoothed by said smoothing circuit being outputted as an output of the voltage converter circuit.

Here, it is preferable that said comparator circuit outputs the first and second control signals in such a way that when the first n-bit signal matches the second n-bit signal, the first and second control signals applied to the gates of said two MOS transistors of said buffer circuit rise to lower the output voltage of said buffer circuit, but when the first n-bit signal matches zero, the first and second control signals applied to the gates of said two MOS transistors of said buffer circuit fall to raise the output voltage of said buffer circuit.

Further, it is preferable that said comparator circuit outputs the first and second control signals in such a way that a predetermined time after one of said two MOS transistors for constituting said buffer circuit has been turned off, the other of said two MOS transistors is turned on.

Further, it is preferable that the semiconductor integrated circuit device further comprises a zero voltage switching control circuit connected between said duty ratio control circuit and said buffer circuit, the instant that and when one of said two MOS transistors for constituting said buffer circuit is turned on, said zero voltage switching control circuit controls a potential difference between the source and the drain of said turned-on MOS transistor at zero volt.

Further, it is preferable that the semiconductor integrated circuit device further comprises: an operation speed detecting circuit for detecting operation speed of the integrated circuit to which the output of the voltage converter circuit is supplied as a driving voltage, in synchronism with a second clock signal applied from the outside, and for outputting a third n-bit signal which can decrement the value of the second n-bit signal by one when the detected operation speed is higher than a predetermined speed but increment the value of the second n-bit signal by one when the detected operation speed is lower than the predetermined speed; and a data holder including: adding means for adding the third n-bit signal to the second n-bit signal; and memory means for storing an output of said adding means, the n-bit signal stored in said memory means being applied to said duty ratio control circuit as an updated second n-bit signal.

Further, it is preferable that said data holder comprises frequency dividing means for dividing a frequency of the first clock signal, and said memory means acquires the output of said adding means in synchronism with an output of said frequency dividing means.

Further, it is preferable that said data holder comprises frequency dividing means for dividing a frequency of the second clock signal, and said memory means acquires the output of said adding means in synchronism with an output of said frequency dividing means.

Further, it is preferable that the semiconductor integrated circuit device further comprises dividing means for dividing a value stored in said memory means by a predetermined positive integer and for applying an obtained quotient to said duty ratio control circuit as an updated second n-bit signal.

Further, it is preferable that the semiconductor integrated circuit device further comprises a stand-by control circuit for, when the integrated circuit to which the output of the voltage converter circuit is supplied as a driving voltage is in stand-by status, interrupting operation of said duty ratio control circuit, and turning on said P-channel MOS transistor and off said N-channel MOS transistor.

Further, it is preferable that the semiconductor integrated circuit device further comprises a stand-by control circuit for, when the integrated circuit to which the output of the voltage converter circuit is supplied as a driving voltage is in stand-by status, interrupting operation of said duty ratio control circuit, and turning off both said P-channel MOS transistor and said N-channel MOS transistor; and wherein said stand-by control circuit comprises supply voltage supplying means for supplying the first supply voltage to the output terminal of said buffer circuit when the integrated circuit is in stand-by status.

Further, it is preferable that the semiconductor integrated circuit device further comprises a limiting circuit for limiting the output voltage of the voltage converter circuit in such a way as to be higher than a half of a difference between the first supply voltage and the second supply voltage on the basis of the output voltage of the voltage converter circuit and the first and second supply voltages.

Further, it is preferable that the semiconductor integrated circuit device further comprises a limiting circuit for limiting the output voltage of the voltage converter circuit in such a way as to be higher than a predetermined value on the basis of the n-bit value stored in said memory circuit.

Further, it is preferable that the semiconductor integrated circuit device further comprises a limiting circuit for limiting the output voltage of the voltage converter circuit in such a way as to be lower than a predetermined value on the basis of the n-bit value stored in said memory circuit.

DETAILED DESCRIPTION OF THE PREFERRED EMBODIMENTS (1st embodiment)

A first embodiment of the semiconductor integrated circuit device according to the present invention will be described hereinbelow with reference to FIGS. 1 and 2.

Figure 1:
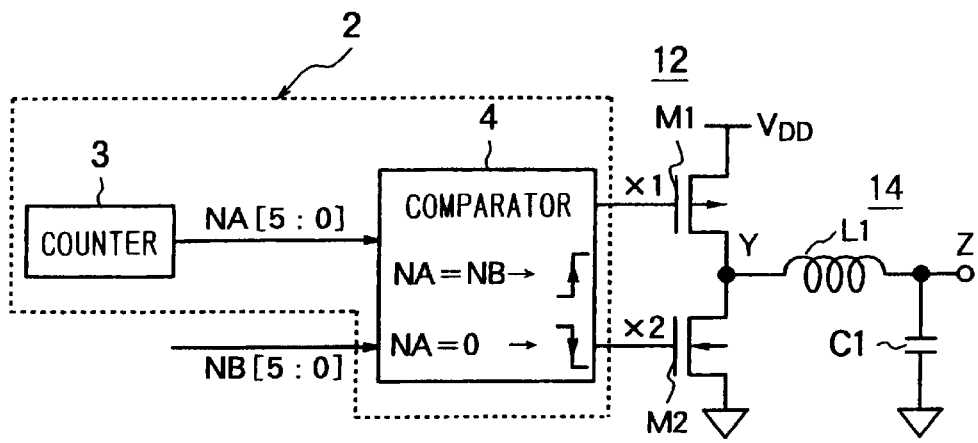
FIG. 1 is a circuit diagram showing a first embodiment of the semiconductor integrated circuit device according to the present invention.

In FIG. 1, the semiconductor integrated circuit device is a voltage converter circuit comprising a duty ratio control circuit 2, a buffer circuit 12, and a filter circuit 14. Further, the duty ratio control circuit 2 comprises a counter 3 and a comparator circuit 4. The counter 3 counts up the number of the clock signals (not shown) one by one up to 63 for each clock period, and outputs the counted-up value as a 6-bit signal NA. Here, when the number of 63 has been counted up, the number returns to 0. Further, a signal NB is a 6-bit external signal inputted from the outside.

When the 6-bit signal NA is 0, the comparator circuit 4 outputs two "L" level signals X1 and X2. On the other hand, when the signal NA matches the signal NB, the comparator circuit 4 outputs two "H" level signals X1 and X2. These two output signals X1 and X2 of the comparator circuit 4 are applied to two gates of a P-channel MOS transistor M1 and an N-channel MOS transistor M2, respectively both constituting the buffer circuit 12.

Further, a source of the P-channel MOS transistor M1 is connected to a supply voltage $V_{DD}$, and a drain thereof is connected to a drain of the N-channel MOS transistor M2. Further, a source of the N-channel MOS transistor M2 is connected to a grounded supply voltage (GND). Therefore, when the "L" level signal X1 is inputted to the gate of the P-channel MOS transistor M1, since the P-channel MOS transistor M1 is turned on, the output voltage Y of the buffer circuit 12 is equal to the supply voltage $V_{DD}$. On the other hand, when the "H" level signal X2 is inputted to the gate of the N-channel MOS transistor M2, since the N-channel MOS transistor M2 is turned on, the output voltage Y of the buffer circuit 12 is equal to the grounded supply voltage.

Figure 2:
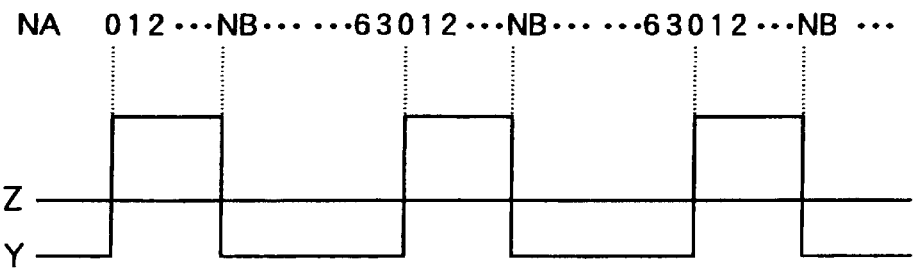
FIG. 2 is a waveform diagram for assistance in explaining the operation of the first embodiment shown in FIG. 1.

Therefore, as shown in FIG. 2, the output signal Y is a pulse voltage signal, which rises when the signal NA is 0 but falls when the signal NA is equal to the signal NB. This voltage signal Y is smoothed through the filter circuit 14 composed of an inductor L1 and a capacitor C1. The output voltage Z of this filter circuit 14 is supplied to an integrated circuit formed on the same substrate, as a driving voltage.

In the above-mentioned semiconductor integrated circuit device, when the signal NB inputted from the outside is changed, it is possible to control the duty ratio of the voltage signal Y outputted by the buffer circuit 12, with the result that the driving voltage supplied to the integrated circuit can be freely controlled.

Figure 3:
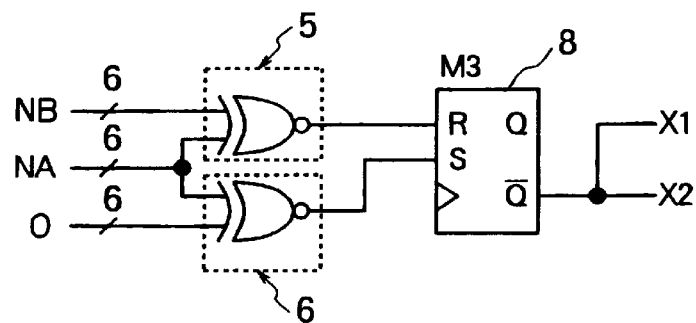
FIG. 3 is a circuit diagram showing a practical comparator circuit related to the semiconductor integrated circuit device according to the present invention.

Further, FIG. 3 shows a first practical example of the comparator circuit 4. This comparator circuit 4 includes two match detecting circuits 5 and 6, and a synchronous-set/synchronous-reset flip-flop (referred to as F/F, hereinafter) 8. The match detecting circuit 5 outputs the "H" level signal only when the signal NA matches the signal NB, and the match detecting circuit 6 outputs the "H" level signal only when the signal NA matches 0. The F/F 8 receives the output of the match detecting circuit 5 as a reset signal and further the output of the match detecting circuit 6 as a set signal. Further, the two signals X1 and X2 are outputted from a /Q (Q bar) terminal of the F/F 8.

Figure 4:
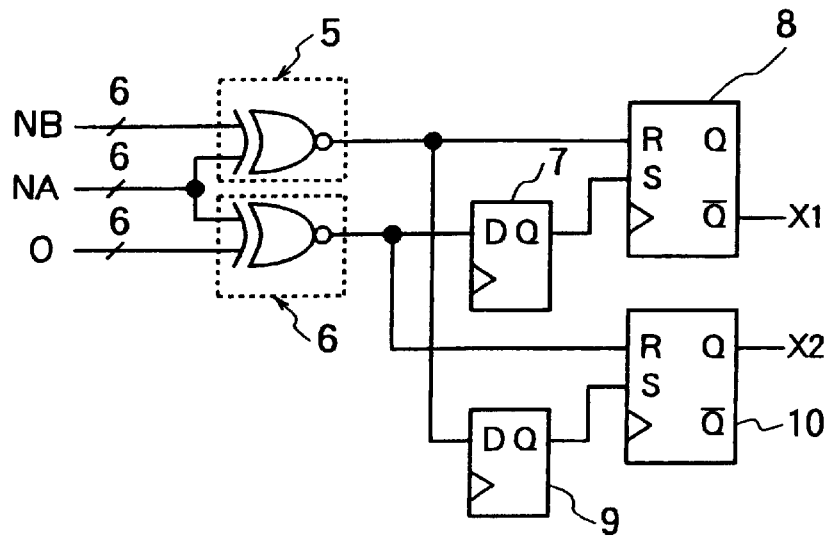
FIG. 4 is a circuit diagram showing another practical comparator circuit related to the semiconductor integrated circuit device according to the present invention.

Further, FIG. 4 shows a second practical example of the comparator circuit 4. This comparator circuit 4 includes two D-type flip-flops 7 and 9 and a synchronous-set/synchronous-reset flip-flop 10, in addition to the circuit elements shown in FIG. 3. The output of the match detecting circuit 5 is applied to a reset terminal of the F/F 8 and a D terminal of the D-type F/F 9. Further, the output of the match detecting circuit 6 is applied to a reset terminal of the F/F 10 and a D terminal of the D-type F/F 7. The output of the D-type F/F 7 is applied to a set terminal of the F/F 8, and the output of the D-type F/F 9 is applied to a set terminal of the F/F 10. Further, the signal X1 is outputted from a /Q (Q bar) terminal of the F/F 8, and the signal X2 is outputted from a Q terminal of the F/F 10. Therefore, when the signal NA matches the signal NB, the signal X2 is the "L" level signal which is delayed by one clock from the signal X1. Further, when the signal NA matches 0, the signal X1 is the "H" level signal which is delayed by one clock from the signal X2. Therefore, when this second practical example of the comparator circuit is adopted, it is possible to prevent a through current flowing when the two MOS transistors M1 and M2 constituting the buffer circuit 12 are turned on at the same time, with the result that the power consumption of the integrated circuit device can be reduced.

(2nd embodiment)

A second embodiment of the semiconductor integrated circuit device according to the present invention will be described hereinbelow with reference to FIG. 5.

Figure 5:
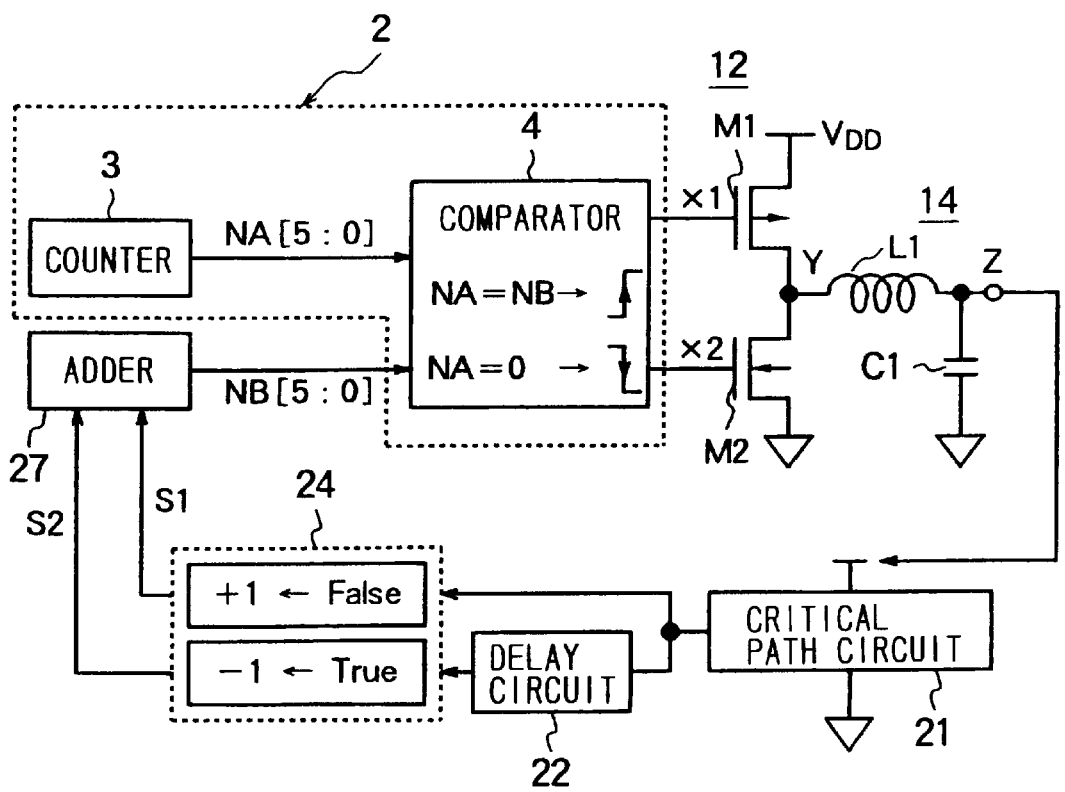
FIG. 5 is a circuit diagram showing a second embodiment of the semiconductor integrated circuit device according to the present invention.

In FIG. 5, the semiconductor integrated circuit device further comprises a critical path circuit 21, a delay circuit 22, a true-false deciding circuit 24 and an adder 27, in addition to the circuit elements of the semiconductor integrated circuit device shown in FIG. 1.

The critical path circuit 21 is a circuit obtained by copying a critical path circuit (through which the signal delay is maximized) of the integrated circuit whose driving voltage is to be controlled. As the supply voltage of this critical path circuit 21, the output voltage Z of the filter circuit 14 is supplied. In other words, the driving voltage of the integrated circuit is monitored by use of this critical path circuit 12. In this second embodiment, it is assumed that the voltage at which this critical circuit can be operated is an operable voltage of the integrated circuit whose driving voltage is controlled. Therefore, as far as this critical path circuit 21 is operable, data can be outputted by this critical path circuit 21. The output of this critical path circuit 21 is directly supplied to the true-false deciding circuit 24 and further indirectly supplied to the same circuit 24 through the delay circuit 22.

When data are not directly transmitted from the critical path circuit 21, the true-false deciding circuit 24 decides that the integrated circuit whose driving voltage is controlled is not operating normally; that is, the driving voltage of the integrated circuit whose driving voltage is controlled (i.e., the output voltage of the filter circuit 14) is too low. In this case, the true-false deciding circuit 24 outputs a signal S1 which can increment a value of the signal NB by one, to the adder 27 to increase the driving voltage. Further, when the data is transmitted through the delay circuit 22, the true-false deciding circuit 24 decides that the integrated circuit whose driving voltage is controlled is operating normally even if delayed; that is, the driving voltage of the integrated circuit to be driven (i.e., the output voltage of the filter circuit 14) is high enough. In this case, the true-false deciding circuit 24 outputs a signal S2 which can decrement a value of the signal NB by one, to the adder 27 to decrease the driving voltage. Further, when the data are transmitted directly from the critical path circuit 21 but not transmitted through the delay circuit 22, the true-false deciding circuit 24 decides that an optimum driving voltage is supplied to the integrated circuit whose driving voltage is controlled. In this case, the true-false deciding circuit 24 does not outputs both the signal S1 or S2 to the adder 27, to increment or decrement a value of the signal NB.

When the signal S1 is received, the adder 27 gives a value obtained by adding one to the current signal NB to the duty ratio control circuit 2, and when the signal S2 is received, the adder 27 gives a value obtained by subtracting one from the current signal NB to the duty ratio control circuit 2.

In the same way as with the case of the first embodiment, in this second embodiment, the output voltage Z of the voltage converter circuit comprising the duty ratio control circuit 2, the buffer circuit 12, and the filter circuit 14 changes according to an increase or a decrease of the value of the signal NB. As a result, it is possible to control the driving voltage supplied to the integrated circuit so as to be optimized.

As understood above, in this second embodiment, since the operation speed of the integrated circuit whose driving voltage is controlled is detected by use of the critical path circuit 21, the delay circuit 22 and the true-false deciding circuit 24, it is possible to increase the driving voltage of the integrated circuit when the detected operation speed is high, but to decrease the driving voltage of the integrated circuit when the detected operation speed is low.

(3rd embodiment)

A third embodiment of the semiconductor integrated circuit device according to the present invention will be described hereinbelow with reference to FIG. 6.

Figure 6:
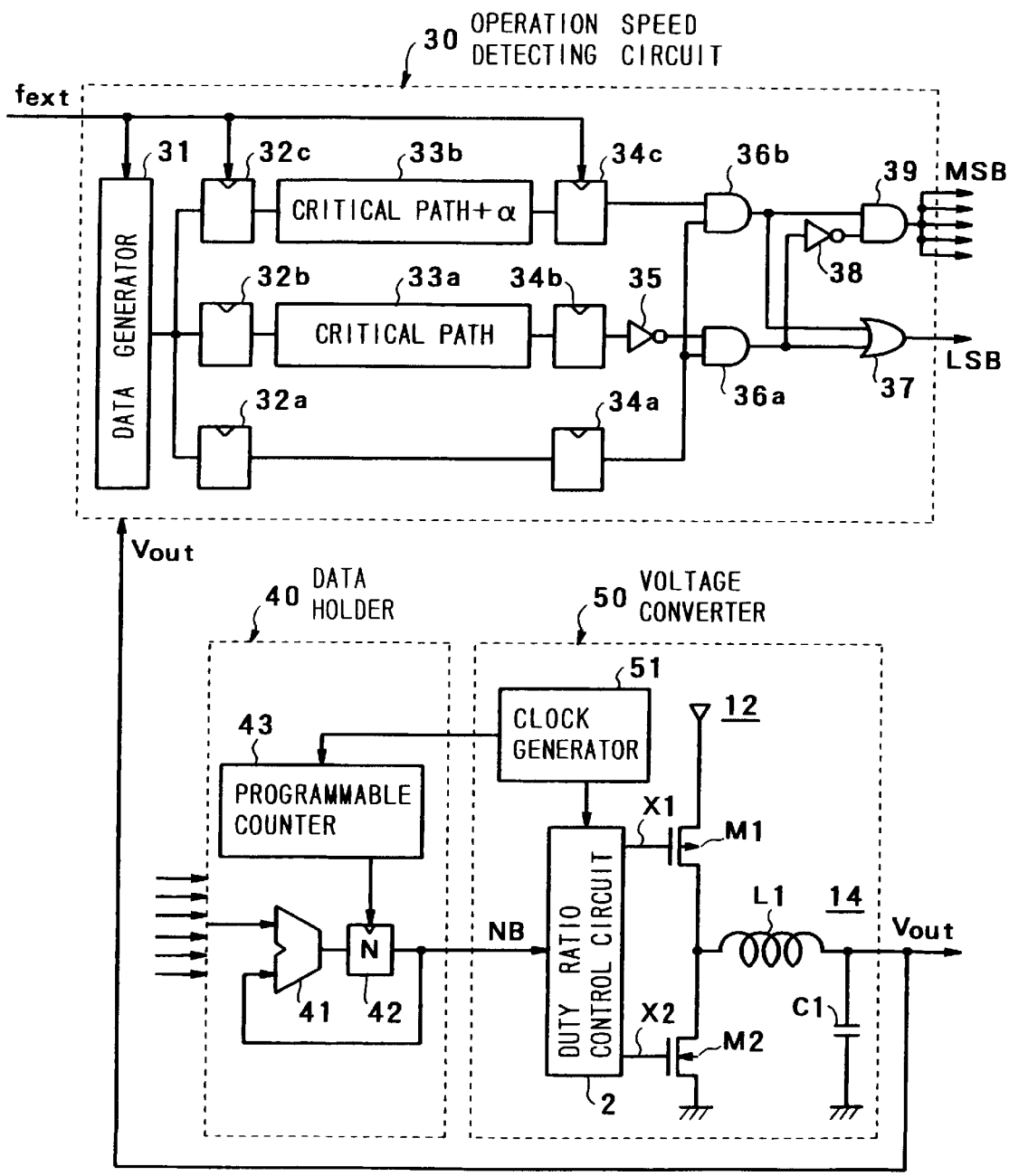
FIG. 6 is a circuit diagram showing a third embodiment of the semiconductor integrated circuit device according to the present invention.

In FIG. 6, the semiconductor integrated circuit device comprises an operation speed detecting circuit 30, a data holder 40, and a voltage converter circuit 50.

The operation speed detecting circuit 30 detects the operation speed of the semiconductor integrated circuit device whose driving voltage is controlled, which comprises a data generator 31, three D-type flip-flops (referred to as F/Fs, hereinafter) 32a, 32b and 32c, two delay circuits 33a and 33b, three other F/Fs 34a, 34b and 34c, an inverter circuit 35, two AND circuits 36a and 36b, an OR circuit 37, another inverter circuit 38, and another AND circuit 39.

The data generator 31 applies a one-bit data signal "1" to the three F/Fs 32a, 32b and 33c, respectively for each period which is by predetermined times longer than a period of the clock signal $f_{ext}$ applied from the outside.

The F/F 32a operates on the basis of the clock signal $f_{ext}$, and supplies data transmitted from the data generator 31 to the F/F 34a. The F/F 32b also operates on the basis of the clock signal $f_{ext}$, and supplies data transmitted from the data generator 31 to the delay circuit 33a. The F/F 32c also operates on the basis of the clock signal $f_{ext}$, and supplies data transmitted from the data generator 31 to the delay circuit 33b.

Here, the delay circuit 33a is a circuit obtained by copying a critical path of the integrated circuit whose driving voltage is controlled. Therefore, to this delay circuit 33a, the driving voltage the same as that of the integrated circuit, that is, an output voltage $V_{out}$ of the voltage converter circuit 50 is supplied. Further, the delay circuit 33a has a delay time the same as that of the critical path. The output of this delay circuit 33a is transmitted to the F/F 34b.

To the delay circuit 33b, the driving voltage the same as that of the integrated circuit, that is, an output voltage $V_{out}$ of the voltage converter circuit 50 is supplied. Further, the delay circuit 33b has a delay time slightly longer than that of the above critical path. The output of this delay circuit 33b is transmitted to the F/F 34c.

The F/Fs 34a to 34c operate on the basis of the clock signal, and output the transmitted data by delaying the data by one clock period. The AND circuit 36a executes a logical product operation on the basis of the output of the F/F 34a and the output of the F/F 34b transmitted via the inverter circuit 35. Further, the AND circuit 36b executes a logical product operation on the basis of the output of the F/F 34a and the output of the F/F 34c.

The OR circuit 37 executes the logical sum operation on the basis of the output of the AND circuit 36a and the output of the AND circuit 36b. Further, the AND circuit 39 executes the logical product operation on the basis of the output of the AND circuit 36a transmitted via the inverter circuit 38 and the output of the AND circuit 36b. Further, the output of the OR circuit 37 is the least significant bit (LSB) of a 6-bit output signal of the operation speed detecting circuit 30, and the output of the AND circuit 39 is the upper 5-bits of the 6-bit output signal of the operation speed detecting circuit 30.

On the other hand, the data holder 40 comprises an adder 41, a memory circuit 42, and a programmable counter 43. Further, the voltage converter circuit 50 is a circuit obtained by adding a clock generator 51 to the voltage converter circuit shown in FIG. 1. Further, the voltage converter circuit shown in FIG. 1 comprises the duty ratio circuit 2, the buffer circuit 12, and the filter circuit 14.

The adder 41 adds a value of the output signal of the operation speed detecting circuit 30 and a value NB stored in the memory circuit 42. The programmable counter 43 divides the frequency of the clock signal generated by the clock generator 51. The dividing ratio of the programmable counter 43 can be adjusted externally. The memory circuit 42 stores the output of the adder 41 in synchronism with the clock signal outputted by the programmble counter 43.

As shown in FIG. 1, the duty ratio control circuit 2 comprises the counter 3 and the comparator circuit 4. This counter 3 operates on the basis of the clock signal outputted by the clock generator 51, and counts up the clock signals one by one from 0 to 63 for each clock signal period. Further, the output of the counter 3 is used as the signal NA, and the value stored in the memory circuit 42 of the data holder 40 is used as the set signal (set value) NB. Further, in the same way as with the case of the first embodiment, the comparator circuit 4 outputs the two signals X1 and X2. These two signals X1 and X2 are used to control the duty ratio of the pulse voltage outputted by the buffer circuit 12, in the same way as with the case of the first embodiment. The output voltage of the buffer circuit 12 is smoothed by the filter circuit 14, and the smoothed voltage $V_{out}$ is supplied to the integrated circuit whose driving voltage is controlled as the driving voltage, and further to the operation speed detecting circuit 30.

The operation of the third embodiment will be described hereinbelow. In the embodiments described hereinbelow, the optimum driving voltage supplied to the integrated circuit is defined as the minimum value lying within a voltage range where the critical path of the integrated circuit can operate normally.

The data "1" generated by the data generator 31 for each predetermined period is applied to the three F/Fs 32a to 33c, respectively being delayed by one clock signal $f_{ext}$.

Here, when the driving voltage of the integrated circuit, that is, the output voltage $V_{out}$ of the voltage converter circuit 50 is higher than an optimum driving voltage, the delay circuit 33a and the delay circuit 33b both operate normally. Therefore, the data "1" received by the F/F 32b is transmitted to the F/F 34b via the delay circuit 33a, and further the data "1" received by the F/F 32c is transmitted to the F/F 34c via the delay circuit 33b. Further, the data "1" received by the F/F 32a is always transmitted to the F/F 34a, irrespective of the magnitude of the driving voltage. Therefore, the outputs of the three F/Fs 34a to 34c are all "1", one clock after the clock signal $f_{ext}$ has been generated by the data generator 31. Therefore, since the output of the AND circuit 36a is "0" and since the output of the AND circuit 36b is "1", the outputs of both the OR circuit 37 and the AND circuit 39 are both "1". That is, each bit of the 6-bit signal outputted by the operation speed detecting circuit 30 is "1", and the value of the 6-bit signal is a complement of 2. Therefore, when the 6-bit signal is applied to the adder 41, the 6-bit signal functions as "−1", so that the value NB stored in the memory circuit 42 can be decremented by one.

Further, when the output voltage $V_{out}$ of the voltage converter circuit 50 is lower than the optimum driving voltage, the delay circuit 33a and the delay circuit 33b both not operate normally, so that the outputs of both the delay circuits 33a and 33b are "0". Therefore, since the output of the AND circuit 36a is "1" and since the output of the AND circuit 36b is "0", the output of the OR circuit 37 is "1" and the output of the AND circuit 39 is "0". That is, the least significant bit of the 6-bit signal outputted by the operation speed detecting circuit 30 is "1", and the remaining bits thereof are "0". Therefore, when the 6-bit signal is applied to the adder 41, the 6-bit signal functions as "+1", so that the value NB stored in the memory circuit 42 can be incremented by one.

Further, when the output voltage $V_{out}$ of the voltage converter circuit 50 is equal to the optimum driving voltage, although the delay circuit 33a operates normally, the delay circuit 33b does not operate normally, so that the output of the delay circuit 33a is "1" but the output of the delay circuit 33b is "0". Therefore, since the outputs of the AND circuits 36a and 36b "0" are both "0", the outputs of the OR circuit 37 and the AND circuit 39 are both "0". Therefore, in this case, even if the 6-bit signal is applied to the adder 41, the value NB stored in the memory circuit 42 is kept unchanged.

As described above, when the driving voltage of the integrated circuit is higher than the optimum driving voltage, a signal for decreasing the set value NB is outputted by the operation speed detecting circuit 30. Further, when the driving voltage of the integrated circuit is lower than the optimum driving voltage, a signal for increasing the set value NB is outputted by the operation speed detecting circuit 30. Therefore, when the signal for changing the set value NB is applied from the operation speed detecting circuit 30 to the adder 41 of the data holder 40, the adder 41 executes an addition. Here, however, it should be noted that the output of this adder 41 is stored in the memory circuit 42 only when synchronized with the clock signal applied by the programmable counter 43, without being stored at all times.

Here, in this third embodiment, in the case where the data holder 40 does not include the programmable counter 43, the value stored in the memory circuit 42 changes whenever the output of the operation speed detecting circuit 30 is transmitted to the data holder 40. In general, since the time constant (about several ps) of the output stage of the voltage converter circuit 50 is extremely larger than the operation period (several tens ns) of the integrated circuit whose driving voltage is controlled, when the programmable counter 43 is not provided, the semiconductor integrated circuit device including the operation speed detecting circuit, the data holder and the voltage converter circuit becomes unstable as a feedback system. As s result, the output voltage of the voltage converter circuit 50 vibrates as shown by a dashed curve in FIG. 7, without converging to a target value (2.0V in FIG. 7).

Figure 7:
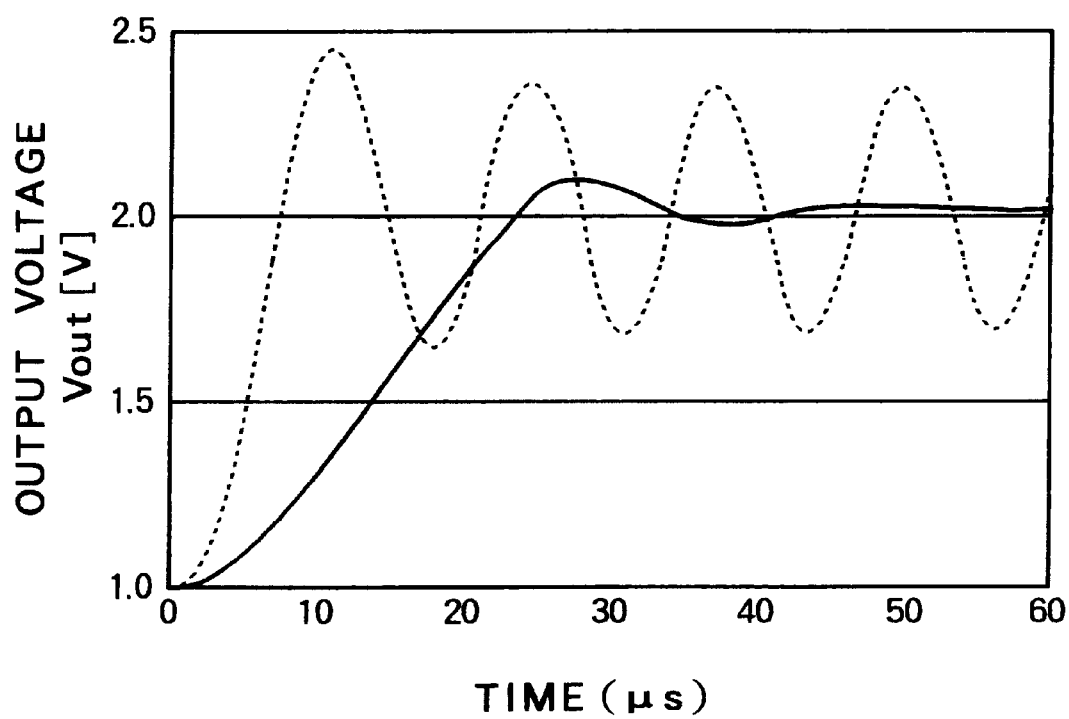
FIG. 7 is a transient response waveform diagram for assistance in explaining the effect of the third embodiment shown in FIG. 6.

In contrast with this, in this third embodiment, since the output of the adder 41 is stored in the memory circuit 42 in synchronism with the clock signal applied by the programmable counter 43 and further since value of the programmable counter 43 can be adjusted, it is possible to converge the output of the voltage converter circuit 50 at a target value without vibration, a shown by a solid curve in FIG. 7. In other words, it is possible to obtain a stable time response of the output voltage of the voltage converter circuit 50.

As described above, in the semiconductor integrated circuit device of this third embodiment, it is possible to supply the optimum driving voltage to the integrated circuit whose driving voltage is to be controlled.

(4th embodiment)

Figure 8:
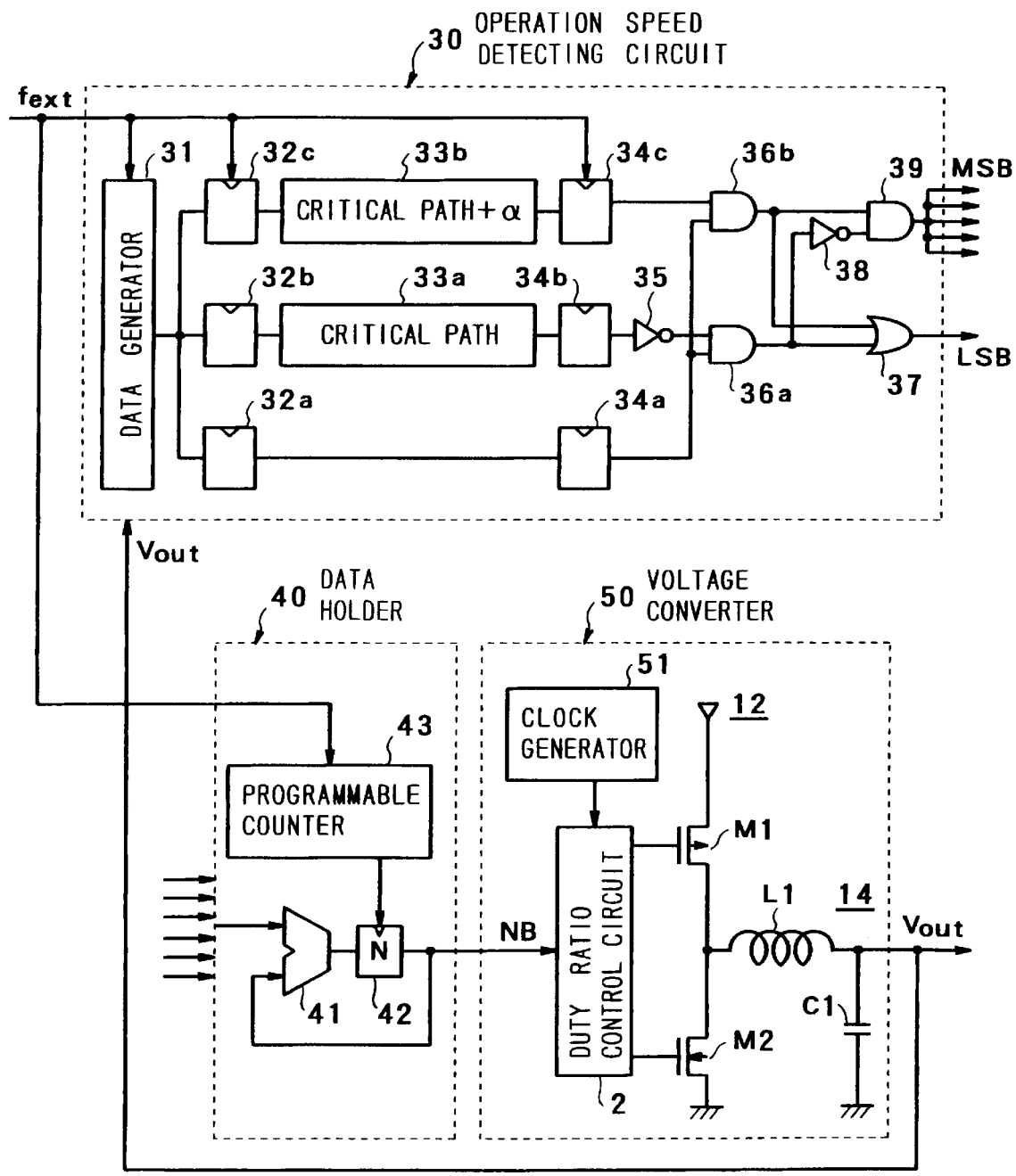
FIG. 8 is a circuit diagram showing a fourth embodiment of the semiconductor integrated circuit device according to the present invention.

A fourth embodiment of the semiconductor integrated circuit device according to the present invention will be described hereinbelow with reference to FIG. 8.

The semiconductor integrated circuit device of this embodiment is roughly the same as with the case of the third embodiment shown in FIG. 6, except that the programmable counter 43 divides the frequency of the clock signal $f_{ext}$ applied from the outside, instead of using the clock signal applied by the clock generator 51. In this fourth embodiment, although the frequency division ratio is different from that of the third embodiment, it is of course possible to obtain the same effect as with the case of the third embodiment.

(5th embodiment)

A fifth embodiment of the semiconductor integrated circuit device according to the present invention will be described hereinbelow with reference to FIG. 9.

The semiconductor integrated circuit device of this embodiment is roughly the same as with the case of the third embodiment shown in FIG. 6, except that the programmable counter 43 is removed but a dividing circuit 48 is newly provided between the memory circuit 42 and the duty ratio control circuit 2. In this fifth embodiment, the memory circuit 42 stores the output of the adder 41 in synchronism with the clock signal applied by the clock generator 51. The value stored in the memory circuit 42 is divided into a predetermined value by the dividing circuit 48, and the quotient thereof is applied to the duty ratio control circuit 2.

Therefore, in this fifth embodiment, although the addition is executed for each clock signal applied by the clock generator 51, it is necessary to use a predetermined number of clocks in order to change the output of the dividing circuit 48. In the same way as with the case of the third embodiment, this fifth embodiment can stabilize the time response of the output voltage of the voltage converter circuit 50, so that the optimum driving voltage can be supplied.

(6th embodiment)

Figure 10:
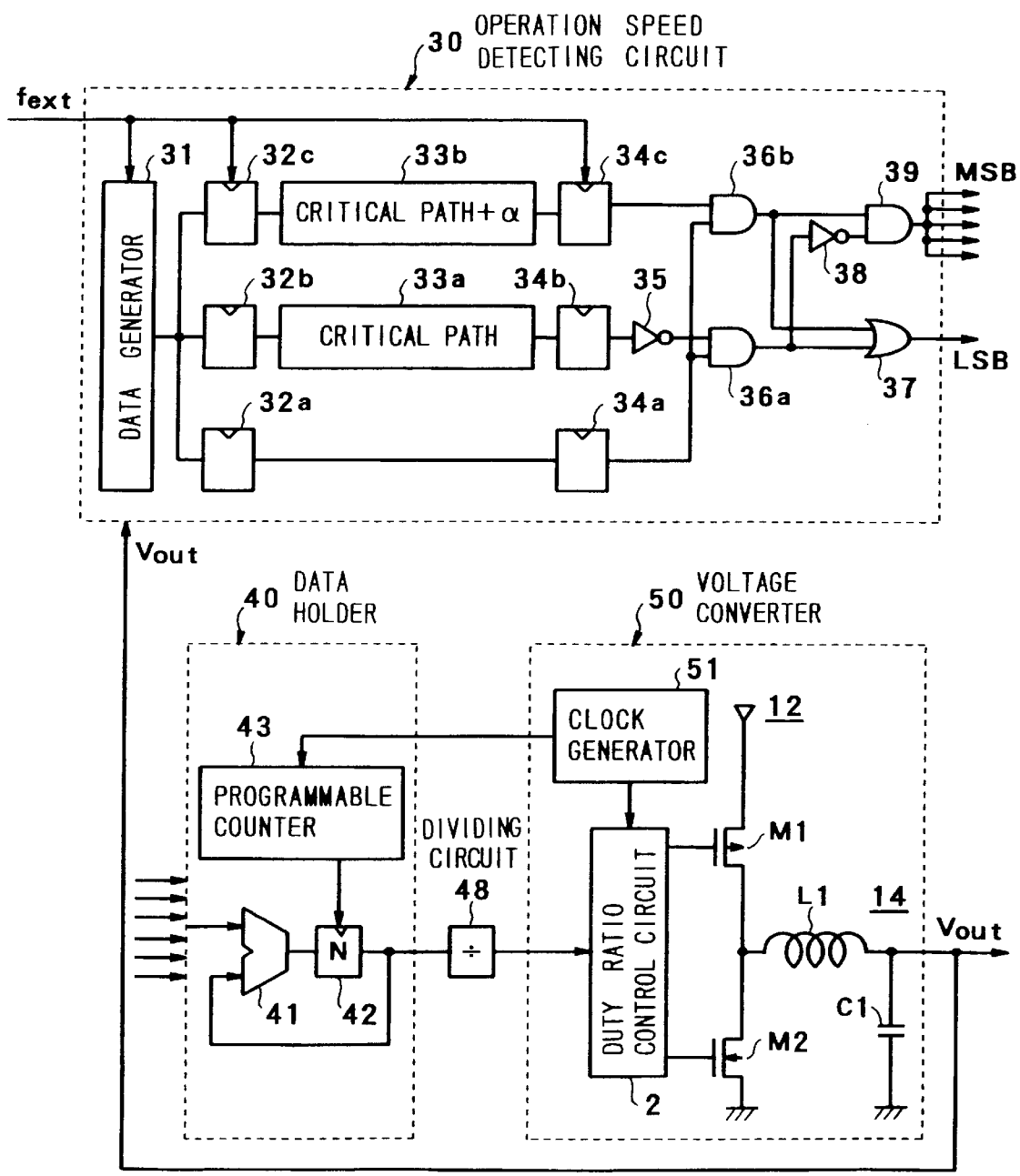
FIG. 10 is a circuit diagram showing a sixth embodiment of the semiconductor integrated circuit device according to the present invention.

A sixth embodiment of the semiconductor integrated circuit device according to the present invention will be described hereinbelow with reference to FIG. 10.

Figure 9:
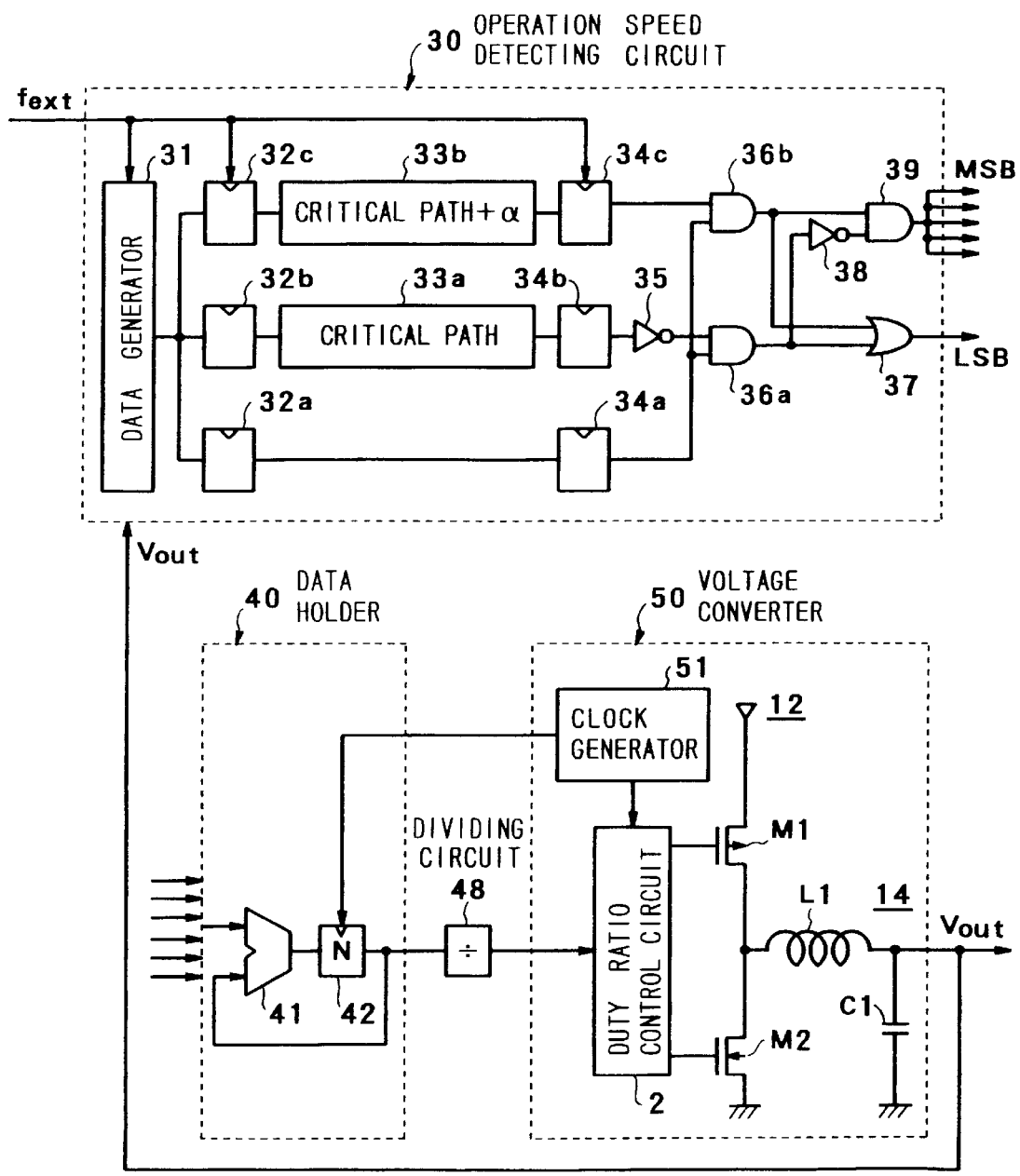
FIG. 9 is a circuit diagram showing a fifth embodiment of the semiconductor integrated circuit device according to the present invention.

The semiconductor integrated circuit device of this embodiment is roughly the same as with the case of the fifth embodiment shown in FIG. 9, except that the programmable counter 43 for dividing the output of the clock generator 51 is connected between the memory circuit 42 and the clock generator 51. Therefore, it is of course possible to obtain the same effect as with the case of the third or fifth embodiment.

(7th embodiment)

Figure 11:
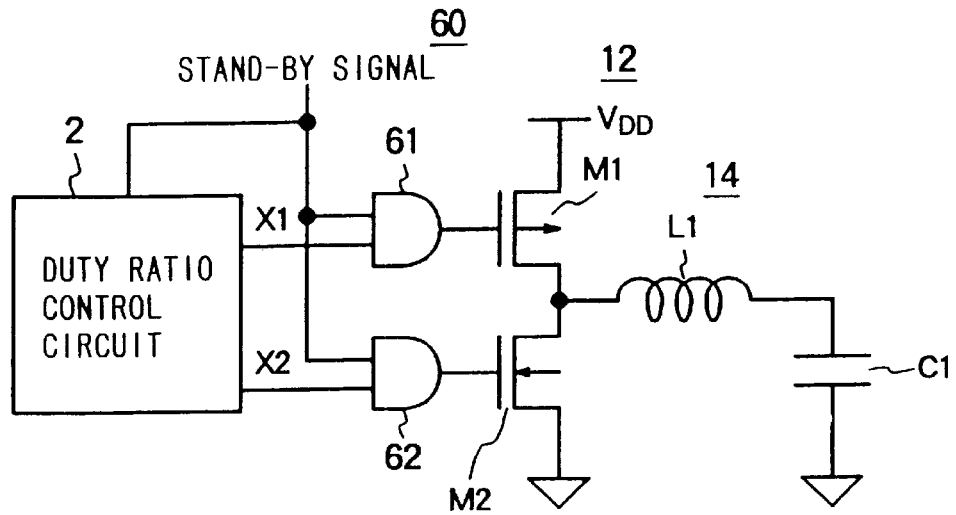
FIG. 11 is a circuit diagram showing a seventh embodiment of the semiconductor integrated circuit device according to the present invention.

A seventh embodiment of the semiconductor integrated circuit device according to the present invention will be described hereinbelow with reference to FIG. 11.

In the semiconductor integrated circuit device of this embodiment, a stand-by control circuit 60 composed of two AND circuits 61 and 62 is connected between the duty ratio control circuit 2 and the buffer circuit 12 in the first to sixth embodiments.

The AND circuit 61 executes a logical product operation on the basis of a stand-by signal and one output signal X1 of the two output signals X1 and X2 of the duty ratio control circuit 22, and applies the operation result to the gate of the P-channel MOS transistor M1 of the buffer circuit 12. Further, the AND circuit 62 executes a logical product operation on the basis of the stand-by signal and the other output signal X2 of the two output signals X1 and X2 of the duty ratio control circuit 22, and applies the operation result to the gate the an N-channel MOS transistor M2 of the buffer circuit 12. Further, this stand-by signal is also applied to the duty ratio control circuit 2.

When the integrated circuit whose driving voltage is controlled is now in stand-by status, the stand-by signal is at "L" level, so that the duty ratio control circuit 2 is kept interrupted; the P-channel MOS transistor M1 constituting the buffer circuit 12 is turned on; and the N-channel MOS transistor M2 is turned off. Therefore, in the stand-by status, the supply voltage $V_{DD}$ is supplied to the integrated circuit via the filter 14. As described above, since the duty ratio control circuit 2 is kept interrupted by the stand-by control circuit 60 in the stand-by status and further since the N-channel MOS transistor M2 is turned off, it is possible to minimize the power loss during the voltage conversion. In this case, however, since the supply voltage is kept supplied to the integrated circuit as the driving voltage, the operation of the integrated circuit can be started at any times.

On the other hand, when the integrated circuit whose driving voltage is controlled is operating, since the integrated circuit is operating, since the stand-by signal changes to "H" level, the outputs of the two AND circuits 61 and 62 are decided according to the signals X1 and X2, so that it is possible to obtain the same operation as with the case of the first to sixth embodiments.

In this seven embodiment, it is of course possible to obtain the same effect as with the case of the first to sixth embodiments.

Further, when the above-mentioned stand-by control circuit 60 is combined with the third to sixth embodiments, it is preferable to set the value of the memory circuit 42 of the data holder 40 to the maximum value of 63 in the stand-by status.

(8th embodiment)

Figure 12:
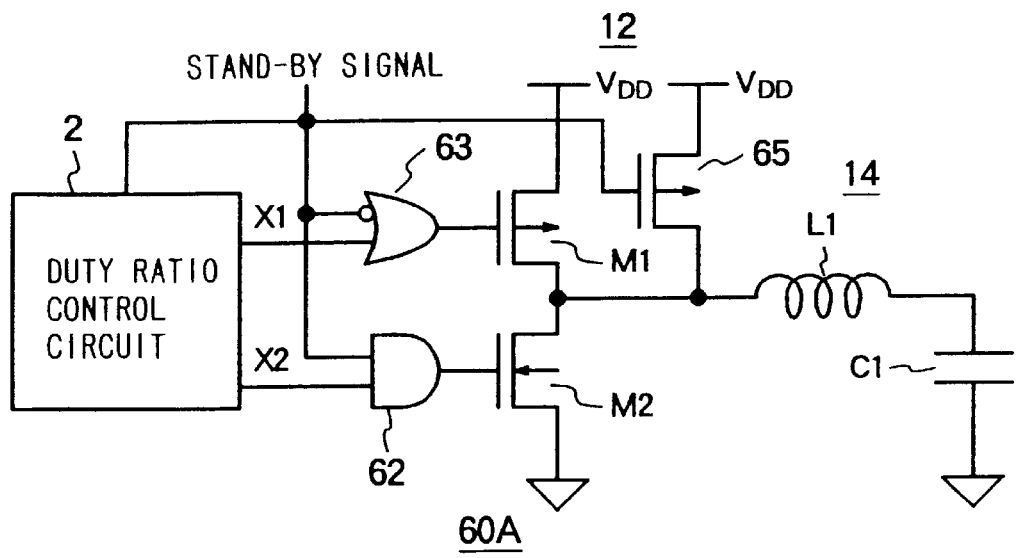
FIG. 12 is a circuit diagram showing an eighth embodiment of the semiconductor integrated circuit device according to the present invention.

A eighth embodiment of the semiconductor integrated circuit device according to the present invention will be described hereinbelow with reference to FIG. 12.

In the semiconductor integrated circuit device of this embodiment, the stand-by control circuit 60 of the seventh embodiment of the semiconductor integrated circuit device is replaced with a stand-by control circuit 60A. In this stand-by control circuit 60A, an OR circuit 63 is provided instead of the AND circuit 61 of the stand-by control circuit 60, and further a P-channel MOS transistor 65 is newly added.

The OR circuit 63 executes a logical sum operation on the basis of an inverted stand-by signal and an output signal X1 of the duty ratio control circuit 2, and applies the operation result to the gate of the P-channel MOS transistor M1 of the buffer circuit 12. A source of the P-channel MOS transistor 65 is connected to the supply voltage $V_{DD}$; a gate thereof receives the stand-by signal; and a drain thereof is connected to an output terminal of the buffer circuit 12, that is, an input terminal of the filter circuit 14.

In this eighth embodiment constructed as described above, when the semiconductor integrated circuit device whose driving voltage is controlled is in the stand-by status (i.e., the stand-by signal is at "L"), the duty ratio control circuit 2 is kept interrupted by the stand-by control circuit 60A, and further the two MOS transistors M1 and M2 for constituting the buffer circuit 12 are both turned off. In this case, however, since the P-channel MOS transistor 65 is turned on, the supply voltage can be supplied to the integrated circuit via the filter circuit 14.

Further, when the integrated circuit is operating, since the stand-by signal is at "H" level, the outputs of the AND circuit 62 and the OR circuit 63 are decided according to the signals X1 and X2, so that it is possible to obtain the same operation as with the case of the seventh embodiment.

In this eighth embodiment, it is of course possible to obtain the same effect as with the case of the seventh embodiment.

(9th embodiment)

Figure 13:
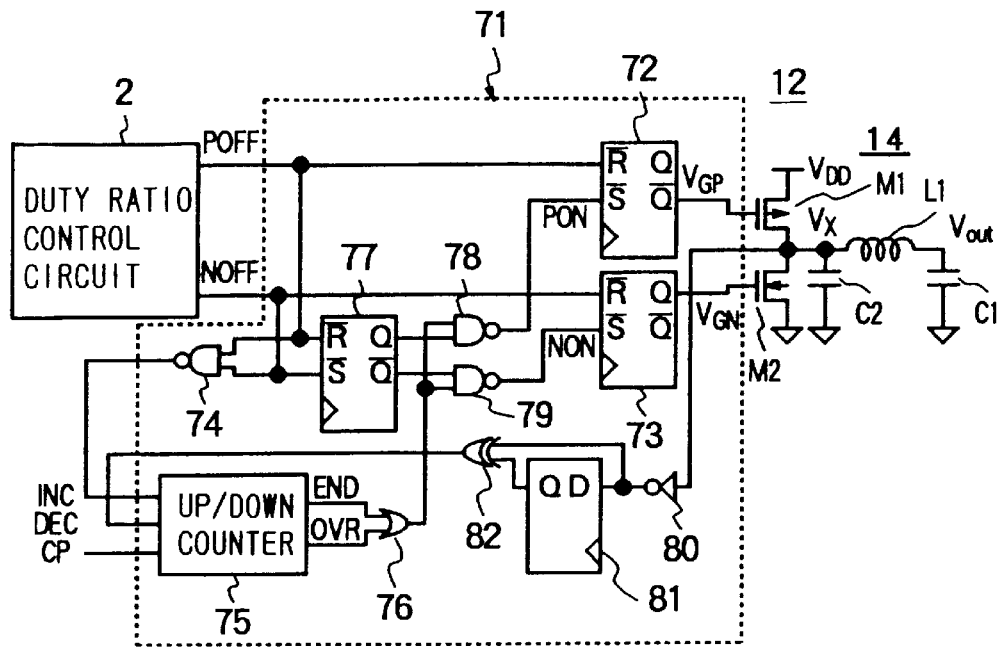
FIG. 13 is a circuit diagram showing a ninth embodiment of the semiconductor integrated circuit device according to the present invention.

A ninth embodiment of the semiconductor integrated circuit device according to the present invention will be described hereinbelow with reference to FIG. 13.

In the semiconductor integrated circuit device of this embodiment, a ZVS (zero voltage switching) control circuit 71 is connected between the duty ratio control circuit 2 and the buffer circuit 12, in the first to sixth embodiments. This ZVS control circuit 71 is such a circuit as to control a potential difference between the source and the drain of the turned-on MOS transistor at zero volt, the instant that and when one of the two MOS transistors M1 and M2 for constituting the buffer circuit 12 is turned on.

The ZVS control circuit 71 comprises three R-S type flip-flops (referred to as F/Fs, hereinafter) 72, 73 and 77, three NAND circuits 74, 78 and 79, an up/down counter 75, an OR circuit 76, an inverter circuit 80, a D-type flip-flop (referred to as F/F, hereinafter) 81, and an exclusive OR circuit 82.

The operation of the ZVS control circuit 71 will be described hereinbelow with reference to FIGS. 14A and 14B. Further, in this ninth embodiment, it is assumed that a predetermined time after one of the two MOS transistors M1 and M2 of the buffer circuit 12 is turned off, the other of the two transistors M1 and M2 is so controlled as to be turned on. Further, in this ninth embodiment, one output signal $V_{GF}$ outputted by the ZVS control circuit 71 corresponds to the signal X1 of the first to sixth embodiments, and the other output signal $V_{GN}$ corresponds to the signal X2.

Now, when the signal POFF for turning off the P-channel MOS transistor M1 changes from "H" level to "L" level, the other signal NOFF of the duty ratio control circuit 2 is kept at "H" level as it is. Since the signal POFF is applied to a /R (R bar) terminal of the F/F 72, when the signal POFF changes to "L" level, the F/F 72 is reset, so that a /Q (Q bar) output $V_{GP}$ thereof changes to "H" to turn off the P-channel MOS transistor M1 (as shown by time t1 in FIG. 14A). At this time, since the driving voltage is kept supplied to the integrated circuit whose driving voltage is controlled, current flows from a parasitic capacitance C2 to the integrated circuit via the filter circuit 14. Therefore, the potential $V_X$ of the output terminal of the buffer circuit 12 falls gradually from $V_{DD}$. Further, since the signal POFF is kept applied to the NAND circuit 74, when the POFF changes to "L" level, an output signal INC of the NAND circuit 74 changes to "H" level. Therefore, the up/down counter 75 starts to count up beginning from 0 in synchronism with the high frequency clock signal (as shown by time t1 in FIG. 14B). Further, since the signal POFF is applied to an /R (R bar) terminal of the F/F 77, the F/F 77 is also reset, so that a Q output thereof changes to "L".

On the other hand, since the circuit threshold value of the inverter circuit 81 is set to a half of the supply voltage $V_{DD}$, when the potential $V_X$ of the output terminal of the buffer circuit 12 becomes $V_{DD}/2$, the output of the inverter circuit 80 changes. A change of this output is detected by both the F/F 81 and the exclusive OR circuit 82; that is, an output signal DEC of the exclusive OR circuit 82 changes to "H", so that the up/down counter 75 starts to count down (as shown by time t1 in FIG. 14B).

When the potential of the output terminal of the buffer circuit 12 becomes 0V; that is, when the count value of the counter 75 reaches zero (as shown by time t2 in FIG. 14B), since a signal END outputted by the counter 75 changes to "H" level, and an output of the OR circuit 76 changes also to "H" level. Therefore, an output signal NON of the NAND circuit 79 changes from "H" to "L". This signal NON is applied to an /S (S bar) terminal of the F/F 73, so that the F/F 73 is set. As a result, the signal $V_{GN}$ applied from a Q terminal of the F/F 73 to the gate of the N-channel MOS transistor M2 changes to "H" level. Therefore, the N-channel transistor M2 is turned on, so that the potential of the output terminal of the buffer circuit 12 is kept at 0V.

Further, in this ninth embodiment, before the up/down counter 75 starts to count down, when the count value exceeds the previously set maximum value (i.e., overflow), since the signal OVR outputted by the counter 75 changes to "H" level, it is possible to turn on the N-channel MOS transistor M2 in the same way as with the case of the signal END.

Figure 14A:
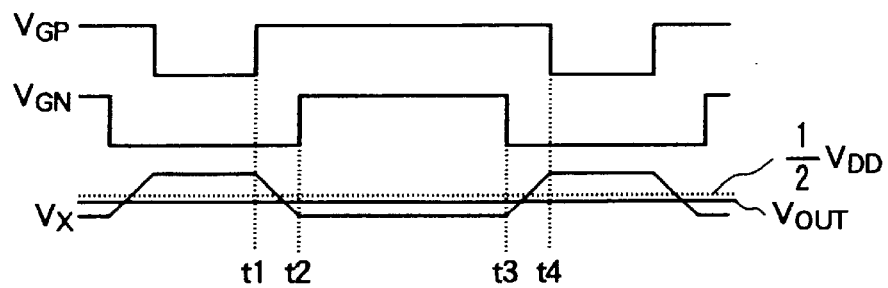
FIGS. 14A and 14B are waveform diagrams for assistance in explaining the operation of the ninth embodiment shown in FIG. 13, respectively.
Figure 14B:
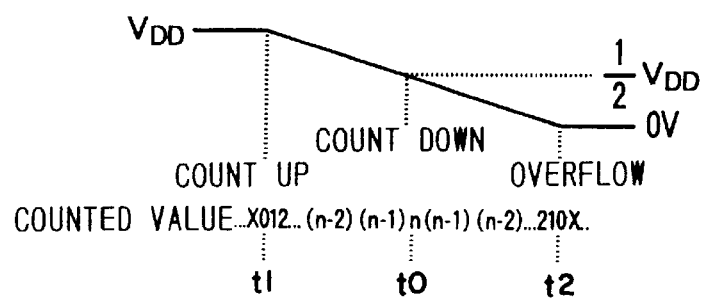

On the other hand, when the output signal NOFF of the duty ratio control circuit 2 changes from "H" level to "L" level, since the gate signal $V_{GN}$ of the N-channel MOS transistor M2 changes from "H" to "L" by the F/F 73, the N-channel MOS transistor M2 is turned off (as shown by time t3 in FIG. 14A). At this time, in the same way as already explained, the up/down counter 75 starts to count up beginning from 0, and to count down when the potential $V_X$ of the output terminal of the buffer circuit 12 reaches $V_{DD}/2$. Further, when the potential $V_X$ becomes the supply voltage $V_{DD}$ (as shown by time t4 in FIG. 14A); that is, when the count value of the counter 75 becomes 0, the signal PON inputted to an /S (S bar) terminal of the F/F 72 via the NAND circuit 78 changes to "L", so that the F/F 72 is set. Therefore, since the signal $V_{GP}$ changes from "H" level to "L" level, the P-channel MOS transistor M2 is turned on, so that the potential $V_X$ is kept at the supply voltage $V_{DD}$.

As described above, in this ninth embodiment, since the ZVS control can be executed, it is possible to minimize the power consumption.

Further, in this ninth embodiment, it is of course possible to control the driving voltage of the integrated circuit, in the same way as with the case of the first to sixth embodiments.

Further, in this ninth embodiment, when the stand-by control circuit as explained in the seventh and eighth embodiments is provided, it is possible to reduce the power consumption when the integrated circuit is in stand-by status. In this case, the stand-by control circuit is connected between the ZVS control circuit 71 and the buffer circuit 12.

(10th embodiment)

Figure 15:
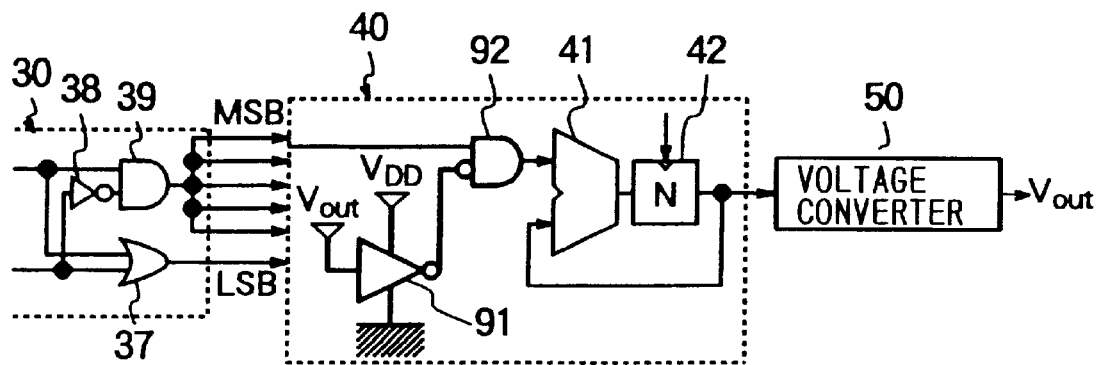
FIG. 15 is a circuit diagram showing a tenth embodiment of the semiconductor integrated circuit device according to the present invention.

A tenth embodiment of the semiconductor integrated circuit device according to the present invention will be described hereinbelow with reference to FIG. 15.

In the semiconductor integrated circuit device of this embodiment, a limiting circuit is provided in the data holder 40 of the semiconductor integrated circuit device of the third to sixth embodiments. This limiting circuit limits the lower limit of the output voltage $V_{out}$ of the voltage converter circuit 50 to a half of the supply voltage $V_{DD}$.

The limiting circuit is composed of an inverter circuit 91 and an AND circuit 92. The circuit threshold value of the inverter circuit 91 is set to $V_{DD}/2$. The output voltage $V_{out}$ of the voltage converter circuit 50 is inputted to this inverter circuit 91 as an input signal. When the output of the inverter circuit 91 is at "L", the AND circuit 92 transmits the output of the operation speed detecting circuit 30 to the adder 41 as it is. On the other hand, when the output of the inverter circuit 91 is at "H" level, the AND circuit 92 transmits 0 to the adder 4.

Therefore, when the output voltage $V_{out}$ of the voltage converter circuit 50 is higher than $V_{DD}/2$, since the output of the inverter circuit 91 is at "L", the same operation as with the case of the third to sixth embodiments can be obtained. However, when the output voltage $V_{out}$ of the voltage converter circuit 50 is lower than $V_{DD}/2$, since the output of the inverter circuit 91 is at "H", the output of the adder 41 does not change, so that the output voltage $V_{out}$ of the voltage converter circuit 50 is fixed at $V_{DD}/2$.

(11th embodiment)

Figure 16:
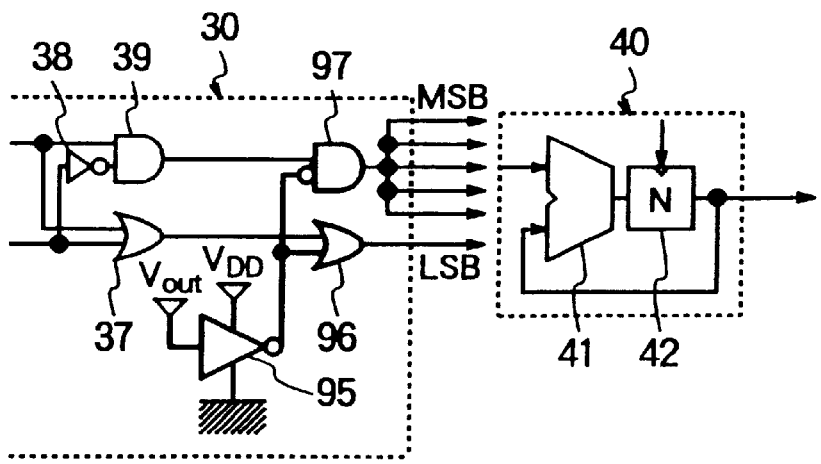
FIG. 16 is a circuit diagram showing an eleventh embodiment of the semiconductor integrated circuit device according to the present invention.

An eleventh embodiment of the semiconductor integrated circuit device according to the present invention will be described hereinbelow with reference to FIG. 16.

In the semiconductor integrated circuit device of this embodiment, a limiting circuit is provided in the operation speed detecting circuit 30 of the third to sixth embodiments. This limiting circuit limits the lower limit of the output voltage $V_{out}$ of the voltage converter circuit 50 to a half of the supply voltage $V_{DD}$.

The limiting circuit comprises an inverter circuit 95, an OR circuit 96, and an AND circuit 97. The circuit threshold value of the inverter circuit 95 is set to $V_{DD}/2$, and the output voltage $V_{out}$ of the voltage converter circuit is inputted to this inverter circuit 95. The OR circuit 96 executes a logical sum operation on the basis of the output of the inverter circuit 95 and the output of the OR circuit 37 of the operation speed detecting circuit 30, and applies the operation result to the adder 41 of the data holder 40 as the least significant bit of the 6-bit output signal of the operation speed detecting circuit 30. The AND circuit 97 executes a logical product operation on the basis of the inverted output of the inverter circuit 95 and the output of the AND circuit 39 of the operation speed detecting circuit 30, and applies the operation result to the adder 41 of the data holder 40 as the upper 5 bits of the 6-bit output signal of the operation speed detecting circuit 30.

In this eleventh embodiment, when the output voltage $V_{out}$ of the voltage converter circuit 50 is higher than $V_{DD}/2$, since the output of the inverter circuit 95 is at "L", the output of the OR circuit 96 is the same as the output of the OR circuit 37. Further, the output of the AND circuit 97 is the same as the output of the AND circuit 39. Therefore, the same operation as with the case of the third to sixth embodiments can be obtained.

On the other hand, when the output voltage $V_{out}$ of the voltage converter circuit 50 is lower than $V_{DD}/2$, since the output of the inverter circuit 95 is at "H", the output of the OR circuit 96 is "at H" and further the output of the AND circuit 97 is at "L". That is, the 6-bit signal applied to the adder 41 is fixed at 000001. Therefore, the adder 41 executes addition operation, so that the value N stored in the memory circuit 42 increases. Here, when the value N increases, the output voltage $V_{out}$ of the voltage converter circuit 50 also increases. When this output voltage $V_{out}$ exceeds $V_{DD}/2$, since the fixed signal value applied to the adder 41 is released, it is possible to execute the ordinary driving voltage control.

As described above, in the eleventh embodiment, when the output voltage $V_{out}$ of the voltage converter circuit 50 is lower than $V_{DD}/2$, it is possible to control the output voltage $V_{out}$ at a voltage higher than $V_{DD}/2$. In this operation, the output voltage $V_{out}$ of the voltage converter circuit 50 can be always controlled higher than $V_{DD}/2$, ever when the output voltage of the voltage converter circuit 50 is low, as immediately after the supply voltage has been turned on. In other words, in this eleventh embodiment, it is possible to obtain the same effect as a starting function for the semiconductor integrated circuit device.

(12th embodiment)

Figure 17:
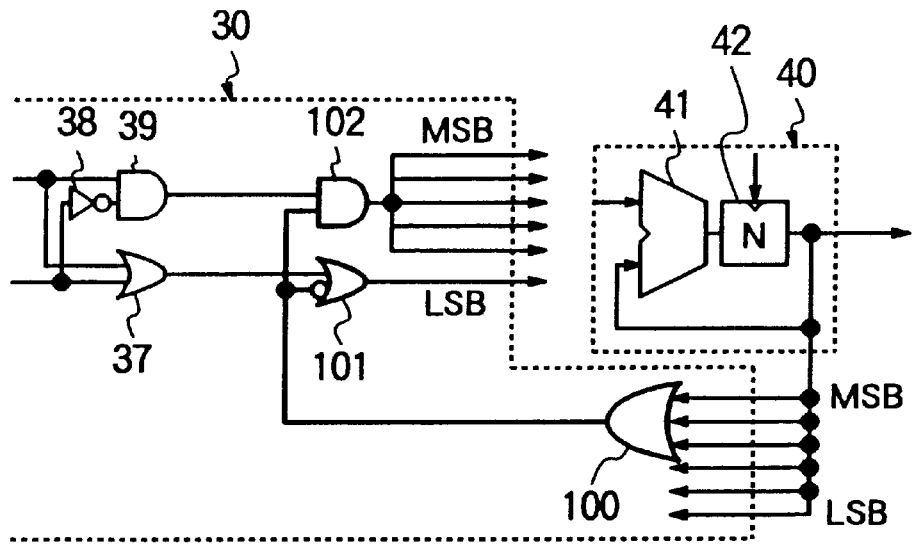
FIG. 17 is a circuit diagram showing a twelfth embodiment of the semiconductor integrated circuit device according to the present invention.

A twelfth embodiment of the semiconductor integrated circuit device according to the present invention will be described hereinbelow with reference to FIG. 17.

In the semiconductor integrated circuit device of this embodiment, a limiting circuit is provided in the operation speed detecting circuit 30 of the semiconductor integrated circuit device of the third to sixth embodiments. This limiting circuit limits the lower limit of the output voltage $V_{out}$ of the voltage converter circuit 50 to ⅛ of the supply voltage $V_{DD}$.

The limiting circuit is composed of two OR circuits 100 and 101, and an AND circuit 102. The OR circuit 100 executes a logical sum operation on the basis of the upper three bits of the 6-bit signal stored in the memory circuit 42. The OR circuit 101 executes a logical sum operation on the basis of an inverted output of the OR circuit 100 and the output of the OR circuit 37, and applies the operation result to the adder 41 as the least significant bit of the 6-bit output signal of the operation speed detecting circuit 30. The AND circuit 102 executes a logical product operation on the basis of the output of the OR circuit 100 and the output of the AND circuit 39, and applies the operation result to the adder 41 of the data holder 40 as the upper 5 bits of the 6-bit output signal of the operation speed detecting circuit 30.

In this twelfth embodiment, when the value stored in the memory circuit 42 is smaller than 8 (001000 in 6 bit representation), since the output of the OR circuit 100 is at "L", the output of the OR circuit 101 is at "H" and the output of the AND circuit 102 is at "L", so that the 6-bit signal applied to the adder is fixed at 000001. Therefore, the adder 41 executes addition operation, so that the value N stored in the memory circuit 42 increases. Here, when the value N increases, the output voltage $V_{out}$ of the voltage converter circuit 50 also increases.

However, when the value N exceeds 8 (=001000), since the output of the OR circuit 100 changes to "H", so that the output of the OR circuit 101 matches the output of the OR circuit 37, and further the output of the OR circuit 102 matches the output of the AND circuit 39. As a result, it is possible to control the value N stored in the memory circuit 42 more than 8.

On the other hand, when the value N exceeds 63 (=111111), the output of the voltage converter circuit 50 $V_{out}$ is $V_{DD}$. Therefore, in this twelfth embodiment, the output voltage of the voltage converter circuit 50 can be so controlled that the output voltage $V_{out}$ thereof is higher than $V_{DD} \times 8/64$, that is, $V_{DD}/8$.

(13th embodiment)

Figure 18:
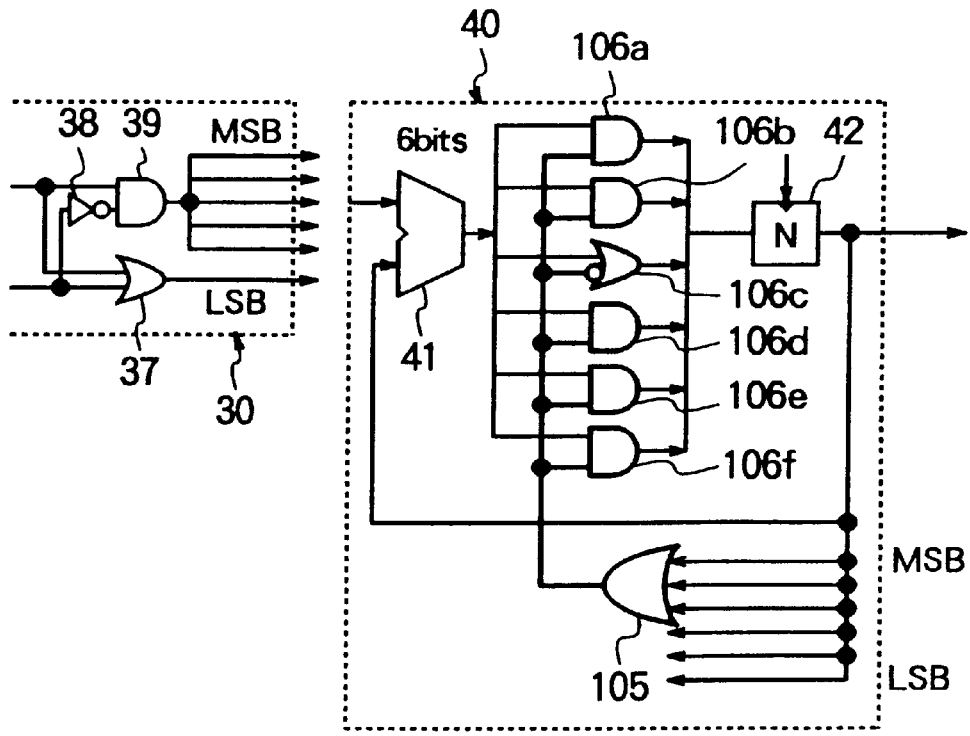
FIG. 18 is a circuit diagram showing a thirteenth embodiment of the semiconductor integrated circuit device according to the present invention.

A thirteenth embodiment of the semiconductor integrated circuit device according to the present invention will be described hereinbelow with reference to FIG. 18.

In the semiconductor integrated circuit device of this embodiment, a limiting circuit is provided in the data holder 40 of the semiconductor integrated circuit device of the third to sixth embodiments. This limiting circuit limits the lower limit of the output voltage $V_{out}$ of the voltage converter circuit 50 to ⅛ of the supply voltage $V_{DD}$.

The limiting circuit comprises an OR circuit 105, five AND circuits 106a, 106b, 106d, 106e and 106f, and an OR circuit 106c. The OR circuit 105 executes a logical sum operation on the basis of the upper 3 bits of the 6-bit signal stored in the memory circuit 42.

The AND circuit 106a executes a logical product operation on the basis of an output of the OR circuit 105 and the most significant bit of the 6-bit signal outputted by the adder 41, and applies the operation result to the memory circuit 42 as the most significant bit of the 6-bit value N stored therein.

The AND circuit 106b executes a logical product operation on the basis of an output of the OR circuit 105 and the second significant bit of the 6-bit output signal of the adder 41, and applies the operation result to the memory circuit 42 as the second significant bit of the 6-bit value N stored therein.

Further, the OR circuit 106c executes a logical sum operation on the basis of an inverted output of the OR circuit 105 and the third significant bit of the 6-bit output signal of the adder 41, and applies the operation result to the memory circuit 42 as the third significant bit of the 6-bit value N stored therein.

Further, the three AND circuits 106d, 106e and 106f execute three logical sum operations on the basis of the output of the OR circuit 105 and the fourth, fifth and sixth significant bits of the 6-bit output signal of the adder 41, respectively and applies the respective operation results to the memory circuit 42 as the fourth, fifth and sixth significant bits of the 6-bit value N stored therein, respectively.

In this thirteenth embodiment, when the output voltage $V_{out}$ of the voltage converter circuit 50 is lower than $V_{DD}/8$; that is, when the value stored in the memory circuit 42 is smaller than 8, since the output of the OR circuit 105 changes to "L", the outputs of the five AND circuits 106a, 106b, 106d, 106e and 106f are all at "L", and the output of only the OR circuit 106c is at "H", so that the value N stored in the memory circuit 42 is 8 (=001000); that is, the data of 8 is stored in the memory circuit 42. Then, the output voltage $V_{out}$ of the voltage converter circuit 50 also increases higher than $V_{DD}/8$. At this time, since the value N stored in the memory circuit 42 is 8 (=001000), the output of the OR circuit 105 changes to "H", so that the signal applied to the memory circuit 42 matches the output of the adder 41. As a result, it is possible to control the output voltage $V_{out}$ at the optimum driving voltage.

As described above, in this thirteenth embodiment, the output voltage $V_{out}$ of the voltage converter circuit 50 can be controlled higher than $V_{DD}/8$.

(14th embodiment)

Figure 19:
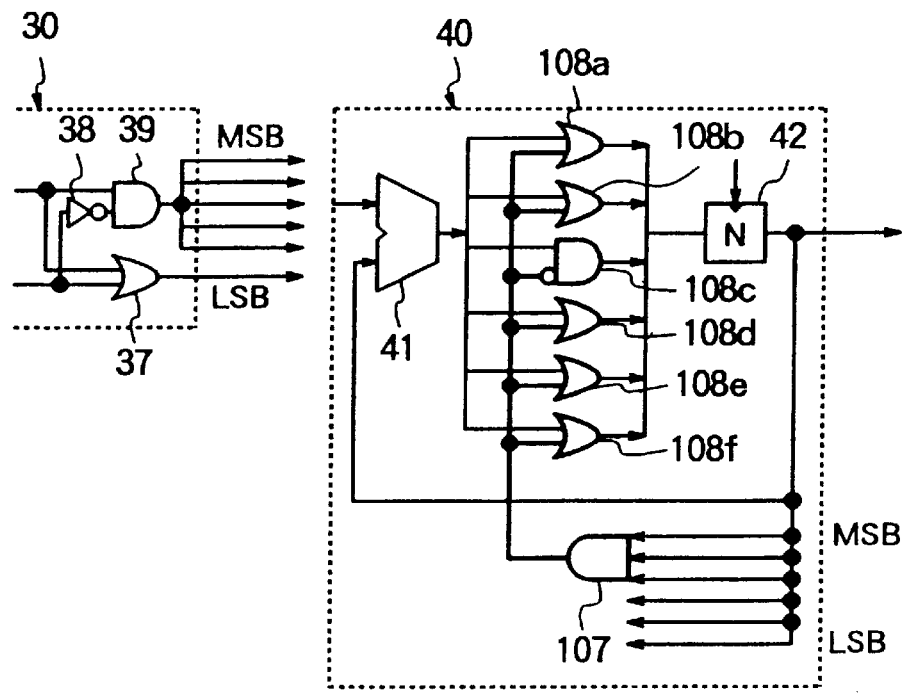
FIG. 19 is a circuit diagram showing a fourteenth embodiment of the semiconductor integrated circuit device according to the present invention.
Figure 20:
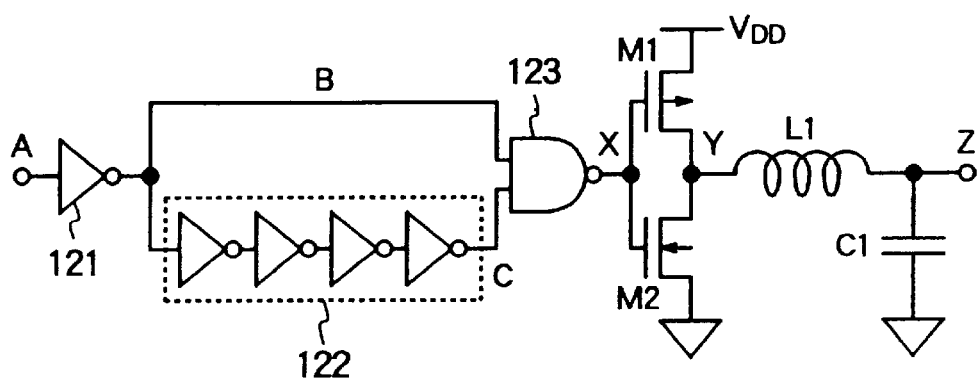
FIG. 20 is a circuit diagram showing a prior art voltage converter circuit.
Figure 21:
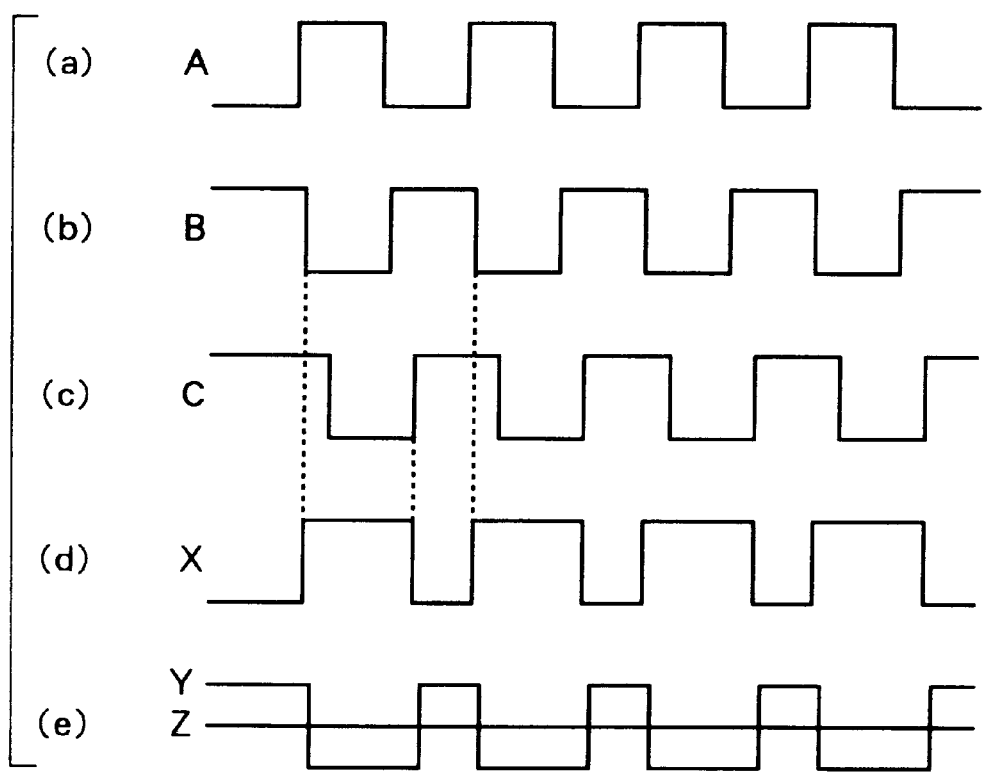
FIG. 21 is a waveform diagram for assistance in explaining the operation of the prior art converter circuit shown in FIG. 20.

A fourteenth embodiment of the semiconductor integrated circuit device according to the present invention will be described hereinbelow with reference to FIG. 19.

In the semiconductor integrated circuit device of this embodiment, a limiting circuit is provided in the data holder 40 of the semiconductor integrated circuit device of the first to sixth embodiments. This limiting circuit limits the upper limit of the output voltage $V_{out}$ of the voltage converter circuit 50 to ⅞ of the supply voltage $V_{DD}$.

The limiting circuit comprises an AND circuit 107, and five OR circuits 108a, 108b, 108d, 108e and 108f, and an AND circuit 108c.

The AND circuit 107 executes a logical product operation on the basis of the upper 3 bits of the 6-bit signal stored in the memory circuit 42.

The two OR circuits 108a and 108b execute logical sum operations on the basis of an output of the AND circuit 107 and the most significant bit and the second significant bit of the 6-bit output signal of the adder 41, and applies the operation results to the memory circuit 42 as the most significant bit and the second significant bit of the 6-bit value N stored therein.

The AND circuit 108c executes a logical product operation on the basis of an inverted output of the OR circuit 107 and the third significant bit of the 6-bit output signal of the adder 41, and applies the operation result to the memory circuit 42 as the third significant bit of the 6-bit value N stored therein.

Further, the three OR circuits 108d, 108e, and 108f execute logical sum operations on the basis of the output of the OR circuit 107 and the fourth, fifth and sixth (the least) significant bits of the 6-bit output signal of the adder 41, and applies the operation results to the memory circuit 42 as the fourth, fifth and sixth significant bits of the 6-bit value N stored therein.

In this fourteenth embodiment, when the output voltage $V_{out}$ of the voltage converter circuit 50 increases up to a voltage ($=V_{DD} \times 56/64$) which corresponds to when the value N stored in the memory circuit 42 is 56 (111000 in 6-bit representation), since the output of the AND circuit 107 changes to "H", the outputs of the five OR circuits 108$a$, 108$b$, 108$d$, 108$e$, and 108$f$ are all at "H", and the output of only the AND circuit 108$c$ is at "L", so that the value N stored in the memory circuit 42 is 55 (=110111); that is, the data of 55 is stored in the memory circuit 42. Then, the output voltage $V_{out}$ of the voltage converter circuit 50 decreases lower than a voltage ($=V_{DD} \times 55/64$) which corresponds to when the value N stored in the memory circuit 42 is 55 (110111 in 6-bit representation). At this time, since the value N stored in the memory circuit 42 is 55 (110111 in 6 bit representation), the output of the AND circuit 107 changes to "L", so that the signal applied to the memory circuit 42 matches the output of the adder 41. As a result, it is possible to control the output voltage $V_{out}$ of the voltage converter circuit 50 at the optimum driving voltage.

As described above, in this fourteenth embodiment, it is possible to control the output voltage $V_{out}$ of the voltage converter circuit 50 lower than $V_{DD} \times 55/64$, that is, roughly lower than $V_{DD} \times 7/8$.

Further, in the above-mentioned various embodiments, although the case where the 6-bit signals are used by way of example, it is of course possible to obtain the same effect as above, even when $n(\geq 2)$-bit signals are used.

As described above, in the semiconductor integrated circuit device according to the present invention, it is possible to freely control the driving voltage of the integrated circuit.

What is claimed is:

1. A semiconductor integrated circuit device provided with a voltage converter circuit which comprises:
    a buffer circuit including:
        a P-channel MOS transistor having a source connected to a first supply voltage; and
        an N-channel MOS transistor having a source connected to a second supply voltage and a drain connected to a drain of said P-channel MOS transistor, an output voltage of the buffer circuit being outputted from a common-connected drain terminals of said two MOS transistors;
    a duty ratio control circuit including:
        a counter for outputting a first n-bit signal by repeatedly counting up numbers from 0 to $(2^n-1)$ one by one in synchronism with a first clock signal; and
        a comparator circuit for comparing the first n-bit signal with a second n-bit signal applied from the outside, and for outputting a first control signal to a gate of said P-channel MOS transistor and a second control signal to said N-channel MOS transistor; and
    a smoothing circuit for smoothing the output voltage of said buffer circuit, a voltage smoothed by said smoothing circuit being outputted as an output of the voltage converter circuit.

2. The semiconductor integrated circuit device of claim 1, wherein said comparator circuit outputs the first and second control signals in such a way that when the first n-bit signal matches the second n-bit signal, the first and second control signals applied to the gates of said two MOS transistors of said buffer circuit rise to lower the output voltage of said buffer circuit, but when the first n-bit signal matches zero, the first and second control signals applied to the gates of said two MOS transistors of said buffer circuit fall to raise the output voltage of said buffer circuit.

3. The semiconductor integrated circuit device of claim 2, wherein said comparator circuit outputs the first and second control signals in such a way that a predetermined time after one of said two MOS transistors for constituting said buffer circuit has been turned off, the other of said two MOS transistors is turned on.

4. The semiconductor integrated circuit device of claim 3, which further comprises a zero voltage switching control circuit connected between said duty ratio control circuit and said buffer circuit, the instant that and when one of said two MOS transistors for constituting said buffer circuit is turned on, said zero voltage switching control circuit controls a potential difference between the source and the drain of said turned-on MOS transistor at zero volt.

5. The semiconductor integrated circuit device of claim 1, which further comprises:
    an operation speed detecting circuit for detecting operation speed of the integrated circuit to which the output of the voltage converter circuit is supplied as a driving voltage, in synchronism with a second clock signal applied from the outside, and for outputting a third n-bit signal which can decrement the value of the second n-bit signal by one when the detected operation speed is higher than a predetermined speed but increment the value of the second n-bit signal by one when the detected operation speed is lower than the predetermined speed; and
    a data holder including:
        adding means for adding the third n-bit signal to the second n-bit signal; and
        memory means for storing an output of said adding means, the n-bit signal stored in said memory means being applied to said duty ratio control circuit as an updated second n-bit signal.

6. The semiconductor integrated circuit device of claim 5, wherein said data holder comprises frequency dividing means for dividing a frequency of the first clock signal, and said memory means acquires the output of said adding means in synchronism with an output of said frequency dividing means.

7. The semiconductor integrated circuit device of claim 5, wherein said data holder comprises frequency dividing means for dividing a frequency of the second clock signal, and said memory means acquires the output of said adding means in synchronism with an output of said frequency dividing means.

8. The semiconductor integrated circuit device of claim 5, which further comprises dividing means for dividing a value stored in said memory means by a predetermined positive integer and for applying an obtained quotient to said duty ratio control circuit as an updated second n-bit signal.

9. The semiconductor integrated circuit device of claim 1, which further comprises a stand-by control circuit for, when the integrated circuit to which the output of the voltage converter circuit is supplied as a driving voltage is in stand-by status, interrupting operation of said duty ratio control circuit, and turning on said P-channel MOS transistor and off said N-channel MOS transistor.

10. The semiconductor integrated circuit device of claim 1, which further comprises a stand-by control circuit for, when the integrated circuit to which the output of the voltage converter circuit is supplied as a driving voltage is in stand-by status, interrupting operation of said duty ratio control circuit, and turning off both said P-channel MOS transistor and said N-channel MOS transistor; and wherein said stand-by control circuit comprises supply voltage supplying means for supplying the first supply voltage to the output terminal of said buffer circuit when the integrated circuit is in stand-by status.

11. The semiconductor integrated circuit device of claim 5, which further comprises a limiting circuit for limiting the output voltage of the voltage converter circuit in such a way as to be higher than a half of a difference between the first supply voltage and the second supply voltage on the basis of the output voltage of the voltage converter circuit and the first and second supply voltages.

12. The semiconductor integrated circuit device of claim 5, which further comprises a limiting circuit for limiting the output voltage of the voltage converter circuit in such a way as to be higher than a predetermined value on the basis of the n-bit value stored in said memory circuit.

13. The semiconductor integrated circuit device of claim 5, which further comprises a limiting circuit for limiting the output voltage of the voltage converter circuit in such a way as to be lower than a predetermined value on the basis of the n-bit value stored in said memory circuit.

14. The semiconductor integrated circuit device of claim 2, which further comprises:
  an operation speed detecting circuit for detecting operation speed of the integrated circuit to which the output of the voltage converter circuit is supplied as a driving voltage, in synchronism with a second clock signal applied from the outside, and for outputting a third n-bit signal which can decrement the value of the second n-bit signal by one when the detected operation speed is higher than a predetermined speed but increment the value of the second n-bit signal by one when the detected operation speed is lower than the predetermined speed; and
  a data holder including:
    adding means for adding the third n-bit signal to the second n-bit signal; and
    memory means for storing an output of said adding means, the n-bit signal stored in said memory means being applied to said duty ratio control circuit as an updated second n-bit signal.

15. The semiconductor integrated circuit device of claim 14, wherein said data holder comprises frequency dividing means for dividing a frequency of the first clock signal, and said memory means acquires the output of said adding means in synchronism with an output of said first frequency dividing means.

16. The semiconductor integrated circuit device of claim 14, wherein said data holder comprises frequency dividing means for dividing a frequency of the second clock signal, and said memory means acquires the output of said adding means in synchronism with an output of said frequency dividing means.

17. The semiconductor integrated circuit device of claim 14, which further comprises dividing means for dividing a value stored in said memory means by a predetermined positive integer and for applying an obtained quotient to said duty ratio control circuit as an updated second n-bit signal.

18. The semiconductor integrated circuit device of claim 14, which further comprises a limiting circuit for limiting the output voltage of the voltage converter circuit in such a way as to be higher than a half of a difference between the first supply voltage and the second supply voltage on the basis of the output voltage of the voltage converter circuit and the first and second supply voltages.

19. The semiconductor integrated circuit device of claim 14, which further comprises a limiting circuit for limiting the output voltage of the voltage converter circuit in such a way as to be higher than a predetermined value on the basis of the n-bit value stored in said memory circuit.

20. The semiconductor integrated circuit device of claim 14, which further comprises a limiting circuit for limiting the output voltage of the voltage converter circuit in such a way as to be lower than a predetermined value on the basis of the n-bit value stored in said memory circuit.

* * * * *